United States Patent
Kino et al.

(10) Patent No.: US 11,845,246 B2
(45) Date of Patent: Dec. 19, 2023

(54) FILM, METAL-CLAD LAMINATE, FLEXIBLE SUBSTRATE, MANUFACTURING METHOD FOR FILM, MANUFACTURING METHOD FOR METAL-CLAD LAMINATE, AND MANUFACTURING METHOD FOR FLEXIBLE SUBSTRATE

(71) Applicant: LG CHEM, LTD., Seoul (KR)

(72) Inventors: Takashi Kino, Tokyo (JP); Soonyong Park, Daejeon (KR); Youngseok Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 240 days.

(21) Appl. No.: 17/056,885

(22) PCT Filed: Jan. 9, 2020

(86) PCT No.: PCT/KR2020/000409
§ 371 (c)(1),
(2) Date: Nov. 19, 2020

(87) PCT Pub. No.: WO2020/145695
PCT Pub. Date: Jul. 16, 2020

(65) Prior Publication Data
US 2021/0268781 A1     Sep. 2, 2021

(30) Foreign Application Priority Data
Jan. 11, 2019 (JP) .................. 2019-003369

(51) Int. Cl.
*B32B 27/28* (2006.01)
*B29C 48/00* (2019.01)
(Continued)

(52) U.S. Cl.
CPC ........ *B32B 27/281* (2013.01); *B29C 48/0021* (2019.02); *B32B 7/12* (2013.01);
(Continued)

(58) Field of Classification Search
None
See application file for complete search history.

(56) References Cited

U.S. PATENT DOCUMENTS 5,411,765 A * 5/1995 Kanakarajan .......... H05K 3/386
                                                       427/388.1
2004/0105989 A1    6/2004 Ohta et al.
(Continued)

FOREIGN PATENT DOCUMENTS

JP   H06/210794    *  8/1994  ............. B32B 15/08
JP   2005186274 A     7/2005
(Continued)

OTHER PUBLICATIONS

Sugimoto—JP H06-210794—MT—intermediate PI layer w-claimed surface roughness—1994 (Year: 1994).*

(Continued)

*Primary Examiner* — John Vincent Lawler
(74) *Attorney, Agent, or Firm* — BRYAN CAVE LEIGHTON PAISNER LLP (57) ABSTRACT

Provided is a film including a matrix layer formed with polyimide for a matrix obtained from pyromellitic dianhydride and m-tolidine, a first adhesive layer formed on one surface of the matrix layer and formed with first thermoplastic polyimide, and a second adhesive layer formed on the other surface of the matrix layer and formed with second thermoplastic polyimide, wherein maximum height roughness of a first interface between the matrix layer and the first adhesive layer and maximum height roughness of a second interface between the matrix layer and the second adhesive layer are 1.0 μm or less.

12 Claims, 3 Drawing Sheets

(51) Int. Cl.
   *B32B 7/12* (2006.01)
   *B32B 15/08* (2006.01)
   *B32B 15/20* (2006.01)
   *B32B 27/08* (2006.01)
   *B32B 37/15* (2006.01)
   *B32B 38/10* (2006.01)
   *C08G 73/10* (2006.01)

(52) U.S. Cl.
   CPC .............. *B32B 15/08* (2013.01); *B32B 15/20* (2013.01); *B32B 27/08* (2013.01); *B32B 37/15* (2013.01); *B32B 38/10* (2013.01); *B32B 2250/03* (2013.01); *B32B 2250/04* (2013.01); *B32B 2457/08* (2013.01); *C08G 73/1067* (2013.01)

(56) References Cited

U.S. PATENT DOCUMENTS

| | | | |
|---|---|---|---|
| 2007/0042202 A1* | 2/2007 | Park | B32B 27/08 428/458 |
| 2009/0022939 A1* | 1/2009 | Yanagida | B32B 27/281 428/101 |
| 2009/0035591 A1 | 2/2009 | Nishikawa et al. | |
| 2009/0142607 A1 | 6/2009 | Narui | |
| 2009/0252957 A1* | 10/2009 | Kasumi | B32B 27/28 428/458 |
| 2009/0317591 A1 | 12/2009 | Sato et al. | |
| 2013/0040162 A1 | 2/2013 | Fujisawa et al. | |
| 2013/0256943 A1 | 10/2013 | Matsutani et al. | |
| 2014/0023847 A1* | 1/2014 | Kochiyama | B32B 27/281 428/458 |
| 2015/0373843 A1 | 12/2015 | Kim et al. | |

FOREIGN PATENT DOCUMENTS

| | | | | |
|---|---|---|---|---|
| JP | 2005/219463 | * | 8/2005 | ............. B32B 15/08 |
| JP | 2006051800 A | | 2/2006 | |
| JP | 2006192800 A | | 7/2006 | |
| JP | 4128031 B2 | | 7/2008 | |
| JP | 2011-149067 A1 | | 8/2011 | |
| JP | 2012/006200 | * | 1/2012 | ........... B32B 15/088 |
| JP | 2012006200 A | | 1/2012 | |
| JP | 2015129200 A | | 7/2015 | |
| JP | 2016192530 A | | 11/2016 | |
| JP | 2018041961 A | | 3/2018 | |
| JP | 2018/059060 | * | 4/2018 | ............. B32B 27/00 |
| JP | 2018051900 A | | 4/2018 | |
| KR | 10-2007-0120571 A | | 12/2007 | |
| KR | 10-0852077 B1 | | 8/2008 | |
| KR | 10-20090004894 A | | 1/2009 | |
| KR | 10-20090068256 A | | 6/2009 | |
| KR | 20110092761 | * | 8/2011 | ............. B32B 15/08 |
| KR | 10-20150006304 A | | 1/2015 | |
| KR | 10-1907941 B1 | | 10/2018 | |
| TW | 201609867 A | | 3/2016 | |
| WO | 2006107043 A1 | | 10/2006 | |
| WO | 2008004496 A1 | | 1/2008 | |

OTHER PUBLICATIONS

Nishinaka—JP 2005-219463 A—MT—PI-metal laminate w-3 layers of PI—not claimed monomers—roughness+motivation—2005 (Year: 2005).*
Matsuura—JP 2012-006200 A—IDS—MT-Google—3 PI layers + roughness of metal—no pyrometallic in adhesive—2012 (Year: 2012).*
Mitutoyo—Surface Roughness—2016 (Year: 2016).*
Uchiyama—JP 2018-059060 A—MT—polyimide w-adhesive PI w-roughness +motivation—2018 (Year: 2018).*
TCI America—m-Tolidine 84-67-3—Dec. 15, 2022 (Year: 2022).*
Jang—KR 2011-0092761 A—MT—metallic laminate w-polyimide w-DSDA—2011 (Year: 2011).*

* cited by examiner

FILM, METAL-CLAD LAMINATE, FLEXIBLE SUBSTRATE, MANUFACTURING METHOD FOR FILM, MANUFACTURING METHOD FOR METAL-CLAD LAMINATE, AND MANUFACTURING METHOD FOR FLEXIBLE SUBSTRATE

The present application is a National Phase entry pursuant to 35 U.S.C. § 371 of International Application No. PCT/KR2020/000409 filed on Jan. 9, 2020, and claims priority to and the benefit of Japanese Patent Application No. 2019-003369, filed with the Japanese Patent Office on Jan. 11, 2019, the entire contents of which are incorporated herein by reference.

FIELD

The present disclosure relates to a film, a metal clad laminate, a flexible substrate, a method for preparing a film, a method for preparing a metal clad laminate, and a method for preparing a flexible substrate.

BACKGROUND

As electronic devices become smaller and lighter recently, demands for light weight and thin flexible printed circuits (FPC) having flexibility have increased. An FPC is capable of accomplishing three-dimensional wiring, movable portion wiring or the like, and is thereby capable of high density mounting in a limited space in an electronic device.

In manufacturing an FPC, a flexible copper clad laminate (FCCL) obtained by attaching a matrix that is an insulator having flexibility, and a metal clad layer such as a copper clad layer, in advance, by providing an adhesive layer or the like in between the two is often used. By etching the metal clad layer, an arbitrary wiring pattern is formed on the laminate.

In such a FCCL, a risk of bending may naturally occur when symmetry of the layer structure on both sides of the matrix is low. In addition, etching treatment on the FCCL may include a cleaning process such as an etching, however, when the FCCL has low dewaterability, the cleaning water may remain in the FCCL structure for a long period of time. In such a case, the dimensions of the FCCL may not be stabilized until the cleaning water is completely removed from the FCCL, which sometimes decreases efficiency in FCCL mass production.

[Patent Document 1] Japanese Patent Application Laid-Open Publication No. 2006-051800

SUMMARY

The present disclosure is directed to providing a polyimide film and a metal clad laminate having high structural symmetry and excellent dimensional stability.

One aspect of the present disclosure provides a film including a matrix layer formed with polyimide for a matrix obtained from pyromellitic dianhydride and m-tolidine, a first adhesive layer formed on one surface of the matrix layer and formed with a first thermoplastic polyimide, and a second adhesive layer formed on the other surface of the matrix layer and formed with a second thermoplastic polyimide, wherein maximum height roughness of a first interface between the matrix layer and the first adhesive layer and maximum height roughness of a second interface between the matrix layer and the second adhesive layer are 1.0 μm or less.

In the film according to one aspect, the first thermoplastic polyimide and the second thermoplastic polyimide may be the same polyimide.

In the film of another aspect, the first thermoplastic polyimide and the second thermoplastic polyimide may be polyimide obtained from pyromellitic anhydride and 2,2-bis[4-(4-aminophenoxy)phenyl]propane.

In the film of a further aspect, the first adhesive layer and the second adhesive layer may have approximately the same thickness.

Another aspect of the present disclosure provides a metal clad laminate including the film, and a metal clad layer formed on at least one surface of the film.

In the metal clad laminate according to one aspect, the metal clad layer may be formed on both surfaces of the film, and peel strength to peel off the metal clad layer from the film may be 10 kg/cm or greater on both surfaces of the film.

Another aspect of the present disclosure provides a flexible circuit including the film, and a conductive pattern formed on at least one surface of the film.

Another aspect of the present disclosure provides a method for preparing a film using a thermal imidization method, the method including preparing a first precursor including a first polyamic acid obtained from pyromellitic dianhydride and m-tolidine, preparing a second precursor including a second polyamic acid and a third precursor including a third polyamic acid, forming a laminate body having the first precursor sandwiched between the second precursor and the third precursor by simultaneously extrusion molding the first precursor, the second precursor and the third precursor, and obtaining a three-layer film by heating the laminate body.

In the method for preparing a film according to one aspect, the obtaining of a three-layer film may include a process of conducting thermal imidization on the first polyamic acid, the second polyamic acid and the third polyamic acid by heating the laminate body to produce polyimide for a matrix derived from the first polyamic acid, a first thermoplastic polyimide derived from the second polyamic acid, and a second thermoplastic polyimide derived from the third polyamic acid.

In the method for preparing a film according to another aspect, the second polyamic acid and the third polyamic acid may be the same polyamic acid.

In the method for preparing a film according to a further aspect, the second polyamic acid and the third polyamic acid may be polyamic acid obtained from pyromellitic anhydride and 2,2-bis[4-(4-aminophenoxy)phenyl]propane.

Another aspect of the present disclosure provides a method for preparing a metal clad laminate using a thermal imidization method, the method including preparing a first precursor including a first polyamic acid obtained from pyromellitic dianhydride and m-tolidine, preparing a second precursor including a second polyamic acid and a third precursor including a third polyamic acid, forming a laminate body having the first precursor sandwiched between the second precursor and the third precursor by simultaneously extrusion molding the first precursor, the second precursor and the third precursor, obtaining a three-layer film by heating the laminate body, and laminating a metal clad layer on the three-layer film.

Another aspect of the present disclosure provides a method for preparing a flexible circuit using a thermal imidization method, the method including preparing a first precursor including first polyamic acid obtained from pyromellitic dianhydride and m-tolidine, preparing a second precursor including a second polyamic acid and a third precursor including a third polyamic acid, forming a laminate body having the first precursor sandwiched between the second precursor and the third precursor by simultaneously extrusion molding the first precursor, the second precursor and the third precursor, obtaining a three-layer film by heating the laminate body, laminating a metal clad layer on the three-layer film, and forming a conductive pattern on at least one surface of the three-layer film by conducting etching treatment on the metal clad layer.

REFERENCE NUMERALS

1: Metal Clad Laminate
10: First Metal Clad Layer
12: First Adhesive Layer
14: Matrix Layer
16: Second Adhesive Layer
18: Second Metal Clad Layer

DETAILED DESCRIPTION

Hereinafter, a discharging device, a molding device and a method for preparing a molded article according to embodiments of the present disclosure will be described with reference to accompanying drawings. In addition, in the following descriptions, like numerals are assigned to constitutions having the same or similar functions. Repeated descriptions on such constitutions are skipped as appropriate.

Figure 1:
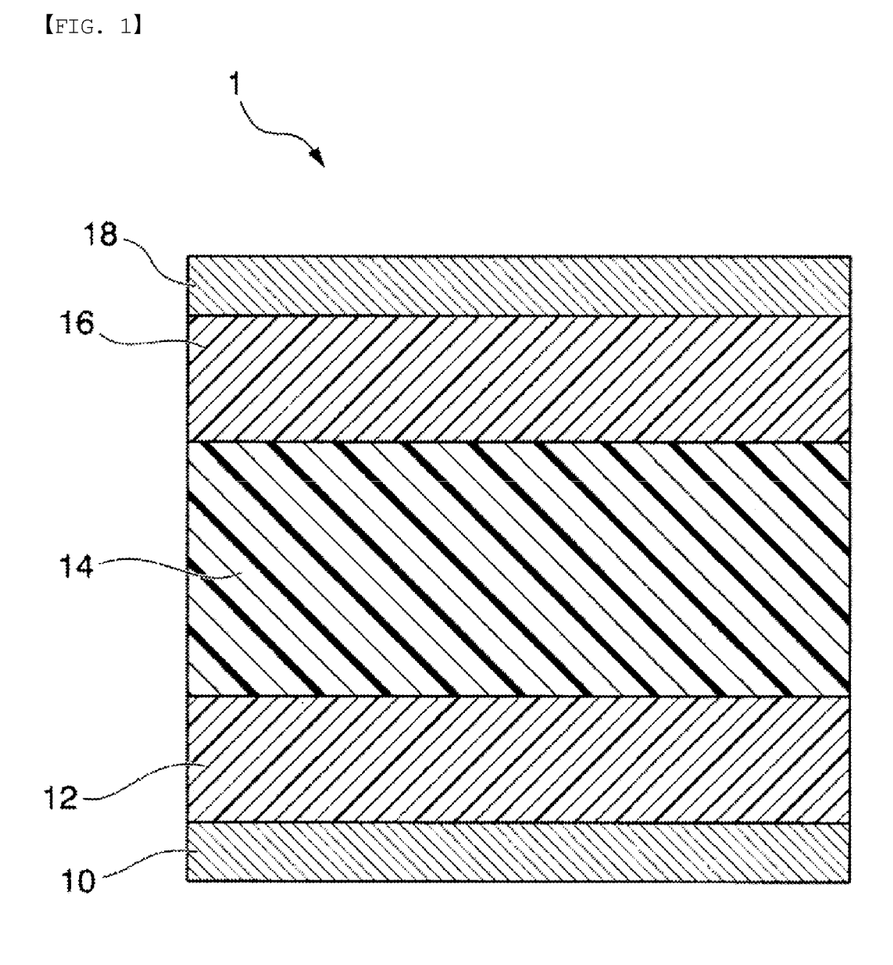
FIG. 1 is a schematic sectional diagram illustrating a metal clad laminate according to an embodiment.

A metal clad laminate according to an embodiment will be described with reference to FIG. 1. FIG. 1 is a schematic sectional diagram illustrating a metal clad laminate according to an embodiment.

[Metal Clad Laminate]

As illustrated in FIG. 1, the metal clad laminate (1) has a structure in which at least a first metal clad layer (10), a first adhesive layer (12), a matrix layer (14), a second adhesive layer (16) and a second metal clad layer (18) are laminated in this order. In other words, the metal clad laminate (1) includes a metal clad layer (10, 18) on both surfaces thereof, and between the metal clad layers (10, 18), a first adhesive layer (12), a matrix layer (14), and a second adhesive layer (16) are sandwiched. Preferably, the metal clad laminate (1) has a symmetric structure around the matrix layer (14) with respect to a plane perpendicular to the laminating direction. However, one of the first metal clad layer (10) and the second metal clad layer (18) may not be included. In addition, the metal clad laminate (1) may have layers other than the above-described layers.

(Metal Clad Layer)

Metal materials forming the metal clad layer (10, 18) are not particularly limited. Examples of the corresponding metal material may include any metal material such as copper, aluminum, stainless steel, iron, nickel or silver, or an alloy of two or more thereof. Preferably, the metal clad layer (10, 18) is formed with copper foil in terms of conductivity, distribution or costs. Materials of the metal clad layer (10, 18) may be the same as or different from each other.

(Adhesive Layer)

The adhesive layer (12, 16) is provided between the metal clad layer (10, 18) and the matrix layer (14) to adhere these to each other. The first adhesive layer (12) is located between the first metal clad layer (10) and the matrix layer (14), and the second adhesive layer (16) is located between the second metal clad layer (18) and the matrix layer (14).

The adhesive layer (12, 16) is formed with thermoplastic polyimide. Herein, the 'polyimide' in the present specification means a polymer having an imide bond in the molecular structure. In addition, the adhesive layer (12, 16) may also include a plasticizer, a filler or the like in addition to the thermoplastic polyimide. Since the thermoplastic polyimide softens at a high temperature, the adhesive layer may function as an adhesive material adhering the metal clad layer (10, 18) and the matrix layer (14) to each other.

As examples of the polyimide forming the adhesive layer (12, 16), pyromellitic dianhydride (PMDA) is preferably used as a tetracarboxylic acid component, and 2,2-bis[4-(4-aminophenoxy)phenyl]propane (4,4-BAPP) is preferably used as a diamine component. As other examples of the tetracarboxylic acid component of the polyimide of the adhesive layer (12, 16), 3,3',4,4'-biphenyltetracarboxylic dianhydride (s-BPDA), 2,3,3',4'-biphenyltetracarboxylic dianhydride (a-BPDA), 3,3',4,4'-diphenylsulfonetetracarboxylic dianhydride (DSDA), 4,4'-oxydiphthalic anhydride (ODPA), 3,3',4,4'-benzophenonetetracarboxylic dianhydride (BTDA), and derivatives thereof (for example, tetracarboxylic acids that are not anhydrides, or esters, halides or the like thereof) may be included. Two or more types of tetracarboxylic acid compounds may also be used in combination. In addition, as other examples of the diamine component of the polyimide of the adhesive layer (12, 16), 1,3-bis(4-aminophenoxy)benzene (TPE-R), 1,4-bis(4-aminophenoxy)benzene (APB), derivatives thereof (for example, those having a benzene ring in the structure having a lower alkyl substituent or a lower alkoxy substituent, or the like) and the like may be included. Two or more types of diamine compounds may also be used in combination. The polyimide forming the first adhesive layer (12) and the polyimide forming the second adhesive layer (16) may be the same as or different from each other.

Preferably, the thickness of the first adhesive layer (12) and the thickness of the second adhesive layer (16) are approximately the same. Herein, the 'approximately the same' means that a difference in the thicknesses between the first adhesive layer (12) and the second adhesive layer (16) is 10% or less.

(Matrix Layer)

The matrix layer (14) functions as a matrix of the metal clad laminate (1). Herein, the 'matrix' in the present specification means a part that is a constituent of the metal clad laminate, and has a function of supporting the metal clad laminate itself.

The matrix layer (14) is formed with non-thermoplastic polyimide. Herein, the 'non-thermoplastic' in the present specification means a property that does not soften up to the temperature of decomposition even when raising a temperature, and includes a polymer having a softening temperature higher than a decomposition temperature or a thermocurable polymer. In addition, the matrix layer (14) may also include, in addition to the non-thermoplastic polyimide, a plasticizer, a filler or the like.

As the polyimide forming the matrix layer (14), PMDA or derivatives thereof (for example, pyromellitic acid, or esters, halides or the like thereof) are preferably used as the tetracarboxylic acid component, and m-tolidine (2,2'-dimethylbenzidine, 4,4'-diamino-2,2'-dimethylbiphenyl) is preferably used as the diamine component.

[Method for Preparing Metal Clad Laminate]

Figure 2:
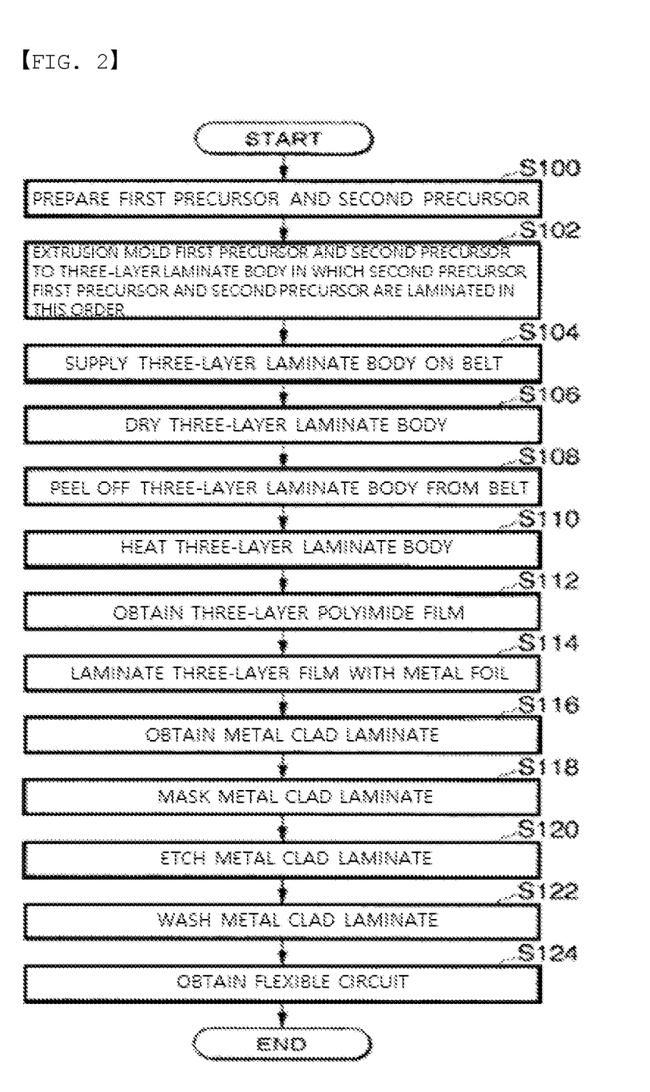
FIG. 2 is a flow chart illustrating one example of a method for preparing a metal clad laminate according to an embodiment.

Next, a method for preparing a metal clad laminate will be described with reference to FIG. 2.

First, a first precursor for a matrix layer and a second precursor for an adhesive layer are prepared by reacting each raw material of polyimide forming the matrix layer and the adhesive layer(s) (S100). The reaction temperature may be, for example, from 20° C. to 60° C. The first precursor and the second precursor are obtained by dissolving polyamic acid produced from reacting a tetracarboxylic acid compound and a diamine compound, raw materials of polyimide, in a solvent (also referred to as varnish).

Next, the obtained first precursor and second precursor are extrusion molded in a form of a three-layer laminate body (three-layer sheet; 12, 14, 16) in which the second precursor, the first precursor and the second precursor are laminated in this order using a dice for three-layer extrusion molding (S102).

The dice for three-layer extrusion molding continuously supplies the extrusion molded three-layer laminate body onto a rotating annular smooth seamless belt (S104).

The three-layer laminate body disposed on the seamless belt is properly dried using a heater or a hot air blower while being carried by the belt (S106). The drying temperature may be, for example, from 100° C. to 200° C., and preferably from 130° C. to 200° C.

Next, the three-layer laminate body is peeled off from the belt (S108), and heated using another dryer (for example, a tented-type dryer) (S110). The drying temperature may be, for example, from 200° C. to 500° C., and preferably from 200° C. to 450° C. The solvent is completely removed thereby, and, in addition thereto, the polyamic acid of the first precursor and the second precursor is polyimidized by heat to obtain a three-layer polyimide film (S112). The three-layer polyimide film has a layer structure in which a first adhesive layer obtained from the second precursor, a matrix layer obtained from the first precursor, and a second adhesive layer obtained from the second precursor are consecutively laminated.

Next, the three-layer polyimide film passes between two rotating nip rollers together with metal foil, and is laminated with the metal foil (S114). As a result, the metal foil is formed on one surface or both surfaces of the three-layer polyimide film to obtain a metal clad laminate (S116).

For the obtained metal clad laminate, masking is conducted with a mask material in accordance with a target wiring pattern shape (S118), and after conducting etching on the non-mask portion with an etchant (S120), the mask material and the etchant are washed (S122), and as a result, a flexible circuit having a target wiring pattern formed thereon is obtained (S124).

In addition, in the present specification, a method of performing polyimidization by heating without using a catalyst as above is referred to as a 'thermal imidization method', and a method of performing polyimidization using a catalyst is referred to as a 'chemical imidization method'. In the present embodiment, the polyimide film is prepared using a thermal imidization method that does not require a catalyst, and the manufacturing process may be simplified, and the manufacturing costs may be reduced. In addition, all the polyamic acid produced in the following synthesis examples is generally polyimidized using a thermal imidization method, and use of a chemical imidization method by a catalyst reaction is either impossible or at least difficult.

EXAMPLES

Synthesis Example

Synthesis Example 1-1: Synthesis of Precursor A1 for Matrix Layer

To a reaction vessel into which m-tolidine was introduced, an appropriate amount of dimethylacetamide (DMAc) was slowly added while stirring, and m-tolidine was completely dissolved in DMAc. Next, PMDA was slowly added thereto while stirring so that PMDA and m-tolidine had a molar ratio of 1:1, and the result was reacted at 40° C. to obtain high viscosity polyamic acid solution A1. Viscosity of the polyamic acid solution A1 measured at 25° C. using a Brookfield B-type viscometer (cone plate-type DV3T) was 2000 poise (200 Pa·s) (hereinafter, the conditions for viscosity measurements are the same).

Synthesis Example 1-2: Synthesis of Precursor A2 for Matrix Layer

To a reaction vessel into which p-phenylenediamine (PDA) was introduced, an appropriate amount of DMAc was slowly added while stirring, and PDA was completely dissolved in DMAc. Next, s-BPDA was slowly added thereto while stirring so that s-BPDA and PDA had a molar ratio of 1:1, and the result was reacted at 40° C. to obtain high viscosity polyamic acid solution A2. Viscosity of the polyamic acid solution A2 measured under the above-mentioned conditions was 2000 poise (200 Pa·s).

Synthesis Example 2-1: Synthesis of Precursor B1 for Adhesive Layer

To a reaction vessel into which 4,4-BAPP was introduced, an appropriate amount of DMAc was slowly added while stirring, and 4,4-BAPP was completely dissolved in DMAc. Next, PMDA was slowly added thereto while stirring so that PMDA and 4,4-BAPP had a molar ratio of 1:1, and the result was reacted at 40° C. to obtain high viscosity polyamic acid solution B1. Viscosity of the polyamic acid solution B1 measured under the above-mentioned conditions was 2000 poise (200 Pa·s).

Synthesis Example 2-2: Synthesis of Precursor B2 for Adhesive Layer

To a reaction vessel into which 4,4-BAPP was introduced, an appropriate amount of DMAc was slowly added while stirring, and 4,4-BAPP was completely dissolved in DMAc. Next, PMDA and s-BPDA were slowly added thereto while stirring so that PMDA, s-BPDA and 4,4-BAPP had a molar ratio of 0.9:0.1:1, and the result was reacted at 40° C. to obtain high viscosity polyamic acid solution B2. Viscosity of the polyamic acid solution B2 measured under the above-mentioned conditions was 2000 poise (200 Pa·s).

Synthesis Example 2-3: Synthesis of Precursor B3 for Adhesive Layer

To a reaction vessel into which 4,4-BAPP was introduced, an appropriate amount of DMAc was slowly added while stirring, and 4,4-BAPP was completely dissolved in DMAc.

Next, PMDA and s-BPDA were slowly added thereto while stirring so that PMDA, s-BPDA and 4,4-BAPP had a molar ratio of 0.5:0.5:1, and the result was reacted at 40° C. to obtain high viscosity polyamic acid solution B3. Viscosity of the polyamic acid solution B3 measured under the above-mentioned conditions was 2000 poise (200 Pa·s).

Synthesis Example 2-4: Synthesis of Precursor B4 for Adhesive Layer

To a reaction vessel into which 4,4-BAPP was introduced, an appropriate amount of DMAc was slowly added while stirring, and 4,4-BAPP was completely dissolved in DMAc. Next, s-BPDA was slowly added thereto while stirring so that s-BPDA and 4,4-BAPP had a molar ratio of 1:1, and the result was reacted at 40° C. to obtain high viscosity polyamic acid solution B4. Viscosity of the polyamic acid solution B4 measured under the above-mentioned conditions was 2000 poise (200 Pa·s).

Synthesis Example 2-5: Synthesis of Precursor B5 for Adhesive Layer

To a reaction vessel into which TPE-R was introduced, an appropriate amount of DMAc was slowly added while stirring, and TPE-R was completely dissolved in DMAc. Next, s-BPDA was slowly added thereto while stirring so that s-BPDA and TPE-R had a molar ratio of 1:1, and the result was reacted at 40° C. to obtain high viscosity polyamic acid solution B5. Viscosity of the polyamic acid solution B5 measured under the above-mentioned conditions was 2000 poise (200 Pa·s).

Synthesis Example 2-6: Synthesis of Precursor B6 for Adhesive Layer

To a reaction vessel into which TPE-R was introduced, an appropriate amount of DMAc was slowly added while stirring, and TPE-R was completely dissolved in DMAc. Next, s-BPDA and a-BPDA were slowly added thereto while stirring so that s-BPDA, a-BPDA and TPE-R had a molar ratio of 0.8:0.2:1, and the result was reacted at 40° C. to obtain high viscosity polyamic acid solution B6. Viscosity of the polyamic acid solution B6 measured under the above-mentioned conditions was 2000 poise (200 Pa·s).

Synthesis Example 2-7: Synthesis of Precursor B7 for Adhesive Layer

To a reaction vessel into which TPE-R was introduced, an appropriate amount of DMAc was slowly added while stirring, and TPE-R was completely dissolved in DMAc. Next, s-BPDA and a-BPDA were slowly added thereto while stirring so that s-BPDA, a-BPDA and TPE-R had a molar ratio of 0.5:0.5:1, and the result was reacted at 40° C. to obtain high viscosity polyamic acid solution B7. Viscosity of the polyamic acid solution B7 measured under the above-mentioned conditions was 2000 poise (200 Pa·s).

Synthesis Example 2-8: Synthesis of Precursor B8 for Adhesive Layer

To a reaction vessel into which TPE-R was introduced, an appropriate amount of DMAc was slowly added while stirring, and TPE-R was completely dissolved in DMAc. Next, a-BPDA was slowly added thereto while stirring so that a-BPDA and TPE-R had a molar ratio of 1:1, and the result was reacted at 40° C. to obtain high viscosity polyamic acid solution B8. Viscosity of the polyamic acid solution B8 measured under the above-mentioned conditions was 2000 poise (200 Pa·s).

Synthesis Example 2-9: Synthesis of Precursor B9 for Adhesive Layer

To a reaction vessel into which 4,4-BAPP was introduced, an appropriate amount of DMAc was slowly added while stirring, and 4,4-BAPP was completely dissolved in DMAc. Next, DSDA was slowly added thereto while stirring so that DSDA and 4,4-BAPP had a molar ratio of 1:1, and the result was reacted at 40° C. to obtain high viscosity polyamic acid solution B9. Viscosity of the polyamic acid solution B9 measured under the above-mentioned conditions was 2000 poise (200 Pa·s).

Synthesis Example 2-10: Synthesis of Precursor B10 for Adhesive Layer

To a reaction vessel into which 4,4-BAPP was introduced, an appropriate amount of DMAc was slowly added while stirring, and 4,4-BAPP was completely dissolved in DMAc. Next, ODPA was slowly added thereto while stirring so that ODPA and 4,4-BAPP had a molar ratio of 1:1, and the result was reacted at 40° C. to obtain high viscosity polyamic acid solution B10. Viscosity of the polyamic acid solution B10 measured under the above-mentioned conditions was 2000 poise (200 Pa·s).

Synthesis Example 2-11: Synthesis of Precursor B11 for Adhesive Layer

To a reaction vessel into which 4,4-BAPP was introduced, an appropriate amount of DMAc was slowly added while stirring, and 4,4-BAPP was completely dissolved in DMAc. Next, BTDA was slowly added thereto while stirring so that BTDA and 4,4-BAPP had a molar ratio of 1:1, and the result was reacted at 40° C. to obtain high viscosity polyamic acid solution B11. Viscosity of the polyamic acid solution B11 measured under the above-mentioned conditions was 2000 poise (200 Pa·s).

Synthesis Example 2-12: Synthesis of Precursor B12 for Adhesive Layer

To a reaction vessel into which TPE-R was introduced, an appropriate amount of DMAc was slowly added while stirring, and TPE-R was completely dissolved in DMAc. Next, DSDA was slowly added thereto while stirring so that DSDA and TPE-R had a molar ratio of 1:1, and the result was reacted at 40° C. to obtain high viscosity polyamic acid solution B12. Viscosity of the polyamic acid solution B12 measured under the above-mentioned conditions was 2000 poise (200 Pa·s).

Synthesis Example 2-13: Synthesis of Precursor B13 for Adhesive Layer

To a reaction vessel into which TPE-R was introduced, an appropriate amount of DMAc was slowly added while stirring, and TPE-R was completely dissolved in DMAc. Next, ODPA was slowly added thereto while stirring so that ODPA and TPE-R had a molar ratio of 1:1, and the result was reacted at 40° C. to obtain high viscosity polyamic acid solution B13. Viscosity of the polyamic acid solution B13 measured under the above-mentioned conditions was 2000 poise (200 Pa·s).

Synthesis Example 2-14: Synthesis of Precursor B14 for Adhesive Layer

To a reaction vessel into which TPE-R was introduced, an appropriate amount of DMAc was slowly added while stirring, and TPE-R was completely dissolved in DMAc. Next, BTDA was slowly added thereto while stirring so that BTDA and TPE-R had a molar ratio of 1:1, and the result was reacted at 40° C. to obtain high viscosity polyamic acid solution B14. Viscosity of the polyamic acid solution B14 measured under the above-mentioned conditions was 2000 poise (200 Pa·s).

Synthesis Example 2-15: Synthesis of Precursor B15 for Adhesive Layer

To a reaction vessel into which APB was introduced, an appropriate amount of DMAc was slowly added while stirring, and APB was completely dissolved in DMAc. Next, PMDA was slowly added thereto while stirring so that PMDA and APB had a molar ratio of 1:1, and the result was reacted at 40° C. to obtain high viscosity polyamic acid solution B15. Viscosity of the polyamic acid solution B15 measured under the above-mentioned conditions was 2000 poise (200 Pa·s).

Synthesis Example 2-16: Synthesis of Precursor B16 for Adhesive Layer

To a reaction vessel into which APB was introduced, an appropriate amount of DMAc was slowly added while stirring, and APB was completely dissolved in DMAc. Next, s-BPDA was slowly added thereto while stirring so that s-BPDA and APB had a molar ratio of 1:1, and the result was reacted at 40° C. to obtain high viscosity polyamic acid solution B16. Viscosity of the polyamic acid solution B16 measured under the above-mentioned conditions was 2000 poise (200 Pa·s).

Synthesis Example 2-17: Synthesis of Precursor B17 for Adhesive Layer

To a reaction vessel into which APB was introduced, an appropriate amount of DMAc was slowly added while stirring, and APB was completely dissolved in DMAc. Next, a-BPDA was slowly added thereto while stirring so that a-BPDA and APB had a molar ratio of 1:1, and the result was reacted at 40° C. to obtain high viscosity polyamic acid solution B17. Viscosity of the polyamic acid solution B17 measured under the above-mentioned conditions was 2000 poise (200 Pa·s).

Synthesis Example 2-18: Synthesis of Precursor B18 for Adhesive Layer

To a reaction vessel into which APB was introduced, an appropriate amount of DMAc was slowly added while stirring, and APB was completely dissolved in DMAc. Next, DSDA was slowly added thereto while stirring so that DSDA and APB had a molar ratio of 1:1, and the result was reacted at 40° C. to obtain high viscosity polyamic acid solution B18. Viscosity of the polyamic acid solution B18 measured under the above-mentioned conditions was 2000 poise (200 Pa·s).

Synthesis Example 2-19: Synthesis of Precursor B19 for Adhesive Layer

To a reaction vessel into which APB was introduced, an appropriate amount of DMAc was slowly added while stirring, and APB was completely dissolved in DMAc. Next, ODPA was slowly added thereto while stirring so that ODPA and APB had a molar ratio of 1:1, and the result was reacted at 40° C. to obtain high viscosity polyamic acid solution B19. Viscosity of the polyamic acid solution B19 measured under the above-mentioned conditions was 2000 poise (200 Pa·s).

Synthesis Example 2-20: Synthesis of Precursor B20 for Adhesive Layer

To a reaction vessel into which APB was introduced, an appropriate amount of DMAc was slowly added while stirring, and APB was completely dissolved in DMAc. Next, BTDA was slowly added thereto while stirring so that BTDA and APB had a molar ratio of 1:1, and the result was reacted at 40° C. to obtain high viscosity polyamic acid solution B20. Viscosity of the polyamic acid solution B20 measured under the above-mentioned conditions was 2000 poise (200 Pa·s).

Synthesis Example 3: Synthesis of Precursor a1 for Matrix Layer

Polyamic acid a1 was obtained by preparing a polyamic acid solution in the same manner as in Synthesis Example 1-1 except that the concentration of the solid was changed so as to have a viscosity of 500 poise (50 Pa·s). Polyamic acid a1 has the same chemical composition as polyamic acid A1.

Synthesis Examples 4-1 to 4-20: Syntheses of Precursors b1 to b20 for Adhesive Layer Polyamic acids b1 to b20 were respectively obtained by preparing a polyamic acid solution in the same manner as in Synthesis Examples 2-1 and 2-20 except that the concentration of the solid was changed so as to have viscosity of 500 poise (50 Pa·s). Polyamic acids b1 to b20 respectively have the same chemical composition as polyamic acids B1 to B20.

For the polyamic acid solutions A1, A2, B1 to B20, a1, and b1 to b20 obtained in the above-described synthesis examples, tetracarboxylic acid components and diamine components used as the raw materials are summarized and listed in the following table. Numbers in the table represent molar ratios.

TABLE 1

| | Tetracarboxylic Acid Component | | | | | | Diamine Component | | | | |
|---|---|---|---|---|---|---|---|---|---|---|---|
| | PMDA | s-BPDA | a-BPDA | DSDA | ODPA | BTDA | m-tolidine | PDA | 4,4-BAPP | TPE-R | APB |
| A1/a1 | 1 | | | | | | 1 | | | | |
| A2 | | 1 | | | | | 1 | | | | |
| B1/b1 | 1 | | | | | | | 1 | | | |
| B2/b2 | 0.9 | 0.1 | | | | | | 1 | | | |
| B3/b3 | 0.5 | 0.5 | | | | | | 1 | | | |
| B4/b4 | | 1 | | | | | | 1 | | | |
| B5/b5 | 1 | | | | | | | | 1 | | |
| B6/b6 | 0.8 | 0.2 | | | | | | | 1 | | |
| B7/b7 | 0.5 | 0.5 | | | | | | | 1 | | |
| B8/b8 | | 1 | | | | | | | 1 | | |
| B9/b9 | | | 1 | | | | | 1 | | | |
| B10/b10 | | | | 1 | | | | 1 | | | |
| B11/b11 | | | | | 1 | | | 1 | | | |
| B12/b12 | | | | 1 | | | | | 1 | | |
| B13/b13 | | | | | 1 | | | | 1 | | |
| B14/b14 | | | | | | 1 | | | 1 | | |
| B15/b15 | 1 | | | | | | | | | | 1 |
| B16/b16 | | 1 | | | | | | | | | 1 |
| B17/b17 | | | 1 | | | | | | | | 1 |
| B18/b18 | | | | 1 | | | | | | | 1 |
| B19/b19 | | | | | 1 | | | | | | 1 |
| B20/b20 | | | | | | 1 | | | | | 1 |

Example and Comparative Example

Example 1-1: Preparation of Copper Clad Laminate C1-1 Using Laminate Method

Polyamic acid solution A1 and polyamic acid solution B1 were extrusion molded using a dice for three-layer extrusion molding. Specifically, by supplying polyamic acid solution A1 to an inner layer portion of the dice for three-layer extrusion molding and polyamic acid solution B1 to an outer layer portion on both sides of the corresponding inner layer portion, polyamic acid solutions A1 and B1 were continuously extruded on a seamless belt made of stainless steel from a discharging port of the dice in a three-layer sheet form in which polyamic acid solution B1, polyamic acid solution A1 and polyamic acid solution B1 are laminated in this order.

This three-layer sheet was heated under a condition of 5 minutes at 130° C., 5 minutes at 160° C. and 5 minutes at 180° C. to remove DMAc of the solvent. Next, by heating the corresponding three-layer sheet under a condition of 3 minutes at 200° C., 3 minutes at 250° C., 3 minutes at 300° C., 3 minutes at 350° C., 3 minutes at 400° C. and 3 minutes at 450° C. while elongating using a tenter dryer, the polyamic acid component in each of the layers was polyimidized while completely drying the three-layer sheet. As a result, three-layer-structured polyimide film c1-1 was obtained.

Copper foil and a commercially-available polyimide film (used as a buffer layer) were prepared, and these were laminated by passing through two nip rollers heated to approximately 400° C. under a nitrogen-substituted environment so as to be laminated in the order of the commercially-available polyimide film (buffer layer), the copper foil, the polyimide film c1-1, the copper foil and the commercially-available polyimide film (buffer layer). As the nip roller, an iron roller of which surface is chrome treated was used.

By peeling off the buffer layer on both surfaces, copper clad laminate C1-1 in which copper foil is laminated on both surfaces of the polyimide film c1-1 was obtained. The thickness of the three-layer-structured polyimide film c1-1 in the copper clad laminate C1-1 was 20 μm. Hereinafter, the above-described preparation method is referred to as a 'laminate method'.

Example 1-2: Preparation of Copper Clad Laminate C1-2 Using Laminate Method

A copper clad laminate was prepared in the same manner as in Example 1-1 except that the amount of each of the polyamic acid solutions supplied from the dice was adjusted so that the obtained polyimide film c1-2 had a thickness of 15 μm. As a result, copper clad laminate C1-2 including three-layer-structured polyimide film c1-2 (thickness 15 μm) was obtained.

Examples 2-1 to 20-1: Preparation of Copper Clad Laminates C2-1 to C20-1 Using Laminate Method Copper clad laminates were prepared in the same manner as in Example 1-1 except that polyamic acid solutions B2 to B20 were respectively used instead of the polyamic acid solution B1 as the precursor for an adhesive layer. As a result, copper clad laminates C2-1 to C20-1 including three-layer-structured polyimide films c2-1 to c20-1 (thickness 20 μm) in which the matrix layer obtained from the polyamic acid solution A1 and the adhesive layer obtained from each of the polyamic acid solutions B2 to B20 are each laminated in the order of the adhesive layer, the matrix layer and the adhesive layer was obtained.

Examples 2-2 to 20-2: Preparation of Copper Clad Laminates C2-2 to C20-2 Using Laminate Method Copper clad laminates were prepared in the same manner as in Example 1-2 except that polyamic acid solutions B2 to B20 were respectively used instead of the polyamic acid solution B1 as the precursor for an adhesive layer. As a result, copper clad laminates C2-2 to C20-2 including three-layer-structured polyimide films c2-2 to c20-2 (thickness 15 μm) in which the matrix layer obtained from the polyamic acid solution A1 and the adhesive layer obtained from each of the polyamic acid solutions B2 to B20 are each laminated in the order of the adhesive layer, the matrix layer and the adhesive layer was obtained.

Comparative Example 1-1: Preparation of Copper Clad Laminate D1-1 Using Cast Method Polyamic acid solution b1 was uniformly coated on one surface of copper foil (first adhesive layer), and heated under a condition of 3 minutes at 40° C., 3 minutes at 60° C., 3 minutes at 80° C. and 3 minutes at 120° C. to remove some of the solvent. Next, polyamic acid solution a1 was uniformly coated on this first adhesive layer (opposite side of copper foil) (matrix layer), and heated under a condition of 3 minutes at 40° C., 3 minutes at 60° C., 3 minutes at 80° C. and 3 minutes at 120° C. to remove some solvent. Next, polyamic acid solution b1 was uniformly coated on this matrix layer (opposite side of first adhesive layer) (second adhesive layer), and heated under a condition of 3 minutes at 40° C., 3 minutes at 60° C., 3 minutes at 80° C. and 3 minutes at 120° C. to remove some solvent. Next, in an air flow dryer under the nitrogen atmosphere, this laminate body was dried under a condition of 3 minutes at 100° C., 3 minutes at 150° C., 3 minutes at 200° C., 3 minutes at 250° C., 3 minutes at 300° C. and 3 minutes at 350° C. using a roll-to-roll process for complete imidization, and as a result, single surface copper clad laminate D1-1' was prepared.

Copper foil, and copper foil having a smooth surface (used as a buffer layer) were prepared, and these were laminated in the order of the copper foil having a smooth surface (buffer layer), the single surface copper clad laminate D1-1', the copper foil, the copper foil having a smooth surface (buffer layer), and then passed through two nip rollers heated to approximately 400° C. under a nitrogen-substituted environment for lamination. As the nip roller, an iron roller of which surface is chrome treated was used.

By peeling off the buffer layer on both surfaces, copper clad laminate D1-1 in which copper foil is laminated even on the side of the single surface copper clad laminate D1-1' on which the copper foil layer is not formed was obtained. The thickness of the three-layer-structured polyimide film d1-1 in the copper clad laminate D1-1 was 20 µm. Hereinafter, the above-described preparation method is referred to as a 'cast method'.

Comparative Example 1-2: Preparation of Copper Clad Laminate D1-2 Using Cast Method A copper clad laminate was prepared in the same manner as in Comparative Example 1-1 except that the coated amount of each of the polyamic acid solutions was adjusted so that the final thickness became 15 µm. As a result, copper clad laminate D1-2 including three-layer-structured polyimide film d1-2 (thickness 15 µm) was obtained.

Comparative Examples 2-1 to 20-1: Preparation of Copper Clad Laminates D2-1 to D20-1 Using Cast Method Copper clad laminates were prepared in the same manner as in Comparative Example 1-1 except that polyamic acid solutions b2 to b20 were respectively used instead of the polyamic acid solution b1 as the precursor for an adhesive layer. As a result, copper clad laminates D2-1 to D20-1 including three-layer-structured polyimide films d2-1 to d20-1 (thickness 20 µm) in which the matrix layer obtained from the polyamic acid solution a1 and the adhesive layer obtained from each of the polyamic acid solutions b2 to b20 are each laminated in the order of the adhesive layer, the matrix layer and the adhesive layer was obtained.

Comparative Examples 2-2 to 20-2: Preparation of Copper Clad Laminates D2-2 to D20-2 Using Cast Method Copper clad laminates were prepared in the same manner as in Comparative Example 1-2 except that polyamic acid solutions b2 to b20 were respectively used instead of the polyamic acid solution b1 as the precursor for an adhesive layer. As a result, copper clad laminates D2-2 to D20-2 including three-layer-structured polyimide films d2-2 to d20-2 (thickness 15 µm) in which the matrix layer obtained from the polyamic acid solution a1 and the adhesive layer obtained from each of the polyamic acid solutions b2 to b20 are each laminated in the order of the adhesive layer, the matrix layer and the adhesive layer was obtained.

Comparative Example 21-1: Preparation of Copper Clad Laminate D21-1 Using Laminate Method A copper clad laminate was prepared in the same manner as in Example 1-1 except that polyamic acid solution A2 was used instead of the polyamic acid solution A1 as the precursor for a matrix layer. As a result, copper clad laminate D21-1 including three-layer-structured polyimide film d21-1 (thickness 20 µm) in which the matrix layer obtained from the polyamic acid solution A2 and the adhesive layer obtained from the polyamic acid solution B1 are each laminated in the order of the adhesive layer, the matrix layer and the adhesive layer was obtained.

Comparative Example 21-2: Preparation of Copper Clad Laminate D21-2 Using Laminate Method A copper clad laminate was prepared in the same manner as in Comparative Example 21-1 except that the amount of each of the polyamic acid solutions supplied from the dice was adjusted so that obtained polyimide film d21-2 had a thickness of 15 µm. As a result, copper clad laminate D21-2 including three-layer-structured polyimide film d21-2 (thickness 15 µm) was obtained.

Comparative Examples 22-1 to 40-1: Preparation of Copper Clad Laminates D22-1 to D40-1 Using Laminate Method Copper clad laminates were prepared in the same manner as in Comparative Example 21-1 except that polyamic acid solutions B2 to B20 were respectively used instead of the polyamic acid solution B1 as the precursor for an adhesive layer. As a result, copper clad laminates D22-1 to D40-1 including three-layer-structured polyimide films d22-1 to d40-1 (thickness 20 µm) in which the matrix layer obtained from the polyamic acid solution A2 and the adhesive layer obtained from each of the polyamic acid solutions B2 to B20 are each laminated in the order of the adhesive layer, the matrix layer and the adhesive layer was obtained.

Comparative Examples 22-2 to 40-2: Preparation of Copper Clad Laminates D22-2 to D40-2 Using Laminate Method Copper clad laminates were prepared in the same manner as in Comparative Example 21-2 except that polyamic acid solutions B2 to B20 were respectively used instead of the polyamic acid solution B1 as the precursor for an adhesive layer. As a result, copper clad laminates D22-2 to D40-2 including three-layer-structured polyimide films d22-2 to d40-2 (thickness 15 μm) in which the matrix layer obtained from the polyamic acid solution A2 and the adhesive layer obtained from each of the polyamic acid solutions B2 to B20 are each laminated in the order of the adhesive layer, the matrix layer and the adhesive layer was obtained.

The examples and the comparative examples are summarized as follows.

TABLE 2

| Example | Matrix Layer Material | Adhesive Layer Material | Thickness of Three-Layer Structured Polyimide Film | Preparation Method | Copper Clad Laminate |
|---|---|---|---|---|---|
| 1-1 | A1 | B1 | 20 μm | Laminate Method | C1-1 |
| 2-1 | | B2 | | | C2-1 |
| 3-1 | | B3 | | | C3-1 |
| 4-1 | | B4 | | | C4-1 |
| 5-1 | | B5 | | | C5-1 |
| 6-1 | | B6 | | | C6-1 |
| 7-1 | | B7 | | | C7-1 |
| 8-1 | | B8 | | | C8-1 |
| 9-1 | | B9 | | | C9-1 |
| 10-1 | | B10 | | | C10-1 |
| 11-1 | | B11 | | | C11-1 |
| 12-1 | | B12 | | | C12-1 |
| 13-1 | | B13 | | | C13-1 |
| 14-1 | | B14 | | | C14-1 |
| 15-1 | | B15 | | | C15-1 |
| 16-1 | | B16 | | | C16-1 |
| 17-1 | | B17 | | | C17-1 |
| 18-1 | | B18 | | | C18-1 |
| 19-1 | | B19 | | | C19-1 |
| 20-1 | | B20 | | | C20-1 |

TABLE 3

| Example | Matrix Layer Material | Adhesive Layer Material | Thickness of Three-Layer Structured Polyimide Film | Preparation Method | Copper Clad Laminate |
|---|---|---|---|---|---|
| 1-2 | A1 | B1 | 15 μm | Laminate Method | C1-2 |
| 2-2 | | B2 | | | C2-2 |
| 3-2 | | B3 | | | C3-2 |
| 4-2 | | B4 | | | C4-2 |
| 5-2 | | B5 | | | C5-2 |
| 6-2 | | B6 | | | C6-2 |
| 7-2 | | B7 | | | C7-2 |
| 8-2 | | B8 | | | C8-2 |
| 9-2 | | B9 | | | C9-2 |
| 10-2 | | B10 | | | C10-2 |
| 11-2 | | B11 | | | C11-2 |
| 12-2 | | B12 | | | C12-2 |
| 13-2 | | B13 | | | C13-2 |
| 14-2 | | B14 | | | C14-2 |
| 15-2 | | B15 | | | C15-2 |
| 16-2 | | B16 | | | C16-2 |
| 17-2 | | B17 | | | C17-2 |
| 18-2 | | B18 | | | C18-2 |
| 19-2 | | B19 | | | C19-2 |
| 20-2 | | B20 | | | C20-2 |

TABLE 4

| Comparative Example | Matrix Layer Material | Adhesive Layer Material | Thickness of Three-Layer Structured Polyimide Film | Preparation Method | Copper Clad Laminate |
|---|---|---|---|---|---|
| 1-1 | a1 | b1 | 20 μm | Cast Method | D1-1 |
| 2-1 | | b2 | | | D2-1 |
| 3-1 | | b3 | | | D3-1 |
| 4-1 | | b4 | | | D4-1 |
| 5-1 | | b5 | | | D5-1 |
| 6-1 | | b6 | | | D6-1 |
| 7-1 | | b7 | | | D7-1 |
| 8-1 | | b8 | | | D8-1 |
| 9-1 | | b9 | | | D9-1 |
| 10-1 | | b10 | | | D10-1 |
| 11-1 | | b11 | | | D11-1 |
| 12-1 | | b12 | | | D12-1 |
| 13-1 | | b13 | | | D13-1 |
| 14-1 | | b14 | | | D14-1 |
| 15-1 | | b15 | | | D15-1 |
| 16-1 | | b16 | | | D16-1 |
| 17-1 | | b17 | | | D17-1 |
| 18-1 | | b18 | | | D18-1 |
| 19-1 | | b19 | | | D19-1 |
| 20-1 | | b20 | | | D20-1 |

TABLE 5

| Comparative Example | Matrix Layer Material | Adhesive Layer Material | Thickness of Three-Layer Structured Polyimide Film | Preparation Method | Copper Clad Laminate |
|---|---|---|---|---|---|
| 1-2 | a1 | b1 | 15 μm | Cast Method | D1-2 |
| 2-2 | | b2 | | | D2-2 |
| 3-2 | | b3 | | | D3-2 |
| 4-2 | | b4 | | | D4-2 |
| 5-2 | | b5 | | | D5-2 |
| 6-2 | | b6 | | | D6-2 |
| 7-2 | | b7 | | | D7-2 |
| 8-2 | | b8 | | | D8-2 |
| 9-2 | | b9 | | | D9-2 |
| 10-2 | | b10 | | | D10-2 |
| 11-2 | | b11 | | | D11-2 |
| 12-2 | | b12 | | | D12-2 |
| 13-2 | | b13 | | | D13-2 |
| 14-2 | | b14 | | | D14-2 |
| 15-2 | | b15 | | | D15-2 |
| 16-2 | | b16 | | | D16-2 |
| 17-2 | | b17 | | | D17-2 |
| 18-2 | | b18 | | | D18-2 |
| 19-2 | | b19 | | | D19-2 |
| 20-2 | | b20 | | | D20-2 |

TABLE 6

| Comparative Example | Matrix Layer Material | Adhesive Layer Material | Thickness of Three-Layer Structured Polyimide Film | Preparation Method | Copper Clad Laminate |
|---|---|---|---|---|---|
| 21-1 | A2 | B1 | 20 μm | Laminate Method | D21-1 |
| 22-1 | | B2 | | | D22-1 |
| 23-1 | | B3 | | | D23-1 |
| 24-1 | | B4 | | | D24-1 |
| 25-1 | | B5 | | | D25-1 |
| 26-1 | | B6 | | | D26-1 |
| 27-1 | | B7 | | | D27-1 |
| 28-1 | | B8 | | | D28-1 |

TABLE 6-continued

| Comparative Example | Matrix Layer Material | Adhesive Layer Material | Thickness of Three-Layer Structured Polyimide Film | Preparation Method | Copper Clad Laminate |
|---|---|---|---|---|---|
| 29-1 | | B9 | | | D29-1 |
| 30-1 | | B10 | | | D30-1 |
| 31-1 | | B11 | | | D31-1 |
| 32-1 | | B12 | | | D32-1 |
| 33-1 | | B13 | | | D33-1 |
| 34-1 | | B14 | | | D34-1 |
| 35-1 | | B15 | | | D35-1 |
| 36-1 | | B16 | | | D36-1 |
| 37-1 | | B17 | | | D37-1 |
| 38-1 | | B18 | | | D38-1 |
| 39-1 | | B19 | | | D39-1 |
| 40-1 | | B20 | | | D40-1 |

TABLE 7

| Comparative Example | Matrix Layer Material | Adhesive Layer Material | Thickness of Three-Layer Structured Polyimide Film | Preparation Method | Copper Clad Laminate |
|---|---|---|---|---|---|
| 21-2 | A2 | B1 | 15 μm | Laminate Method | D21-2 |
| 22-2 | | B2 | | | D22-2 |
| 23-2 | | B3 | | | D23-2 |
| 24-2 | | B4 | | | D24-2 |
| 25-2 | | B5 | | | D25-2 |
| 26-2 | | B6 | | | D26-2 |
| 27-2 | | B7 | | | D27-2 |
| 28-2 | | B8 | | | D28-2 |
| 29-2 | | B9 | | | D29-2 |
| 30-2 | | B10 | | | D30-2 |
| 31-2 | | B11 | | | D31-2 |
| 32-2 | | B12 | | | D32-2 |
| 33-2 | | B13 | | | D33-2 |
| 34-2 | | B14 | | | D34-2 |
| 35-2 | | B15 | | | D35-2 |
| 36-2 | | B16 | | | D36-2 |
| 37-2 | | B17 | | | D37-2 |
| 38-2 | | B18 | | | D38-2 |
| 39-2 | | B19 | | | D39-2 |
| 40-2 | | B20 | | | D40-2 |

Evaluation Example (Evaluation 1: Each Layer Thickness and Interface Roughness)

Figure 3:
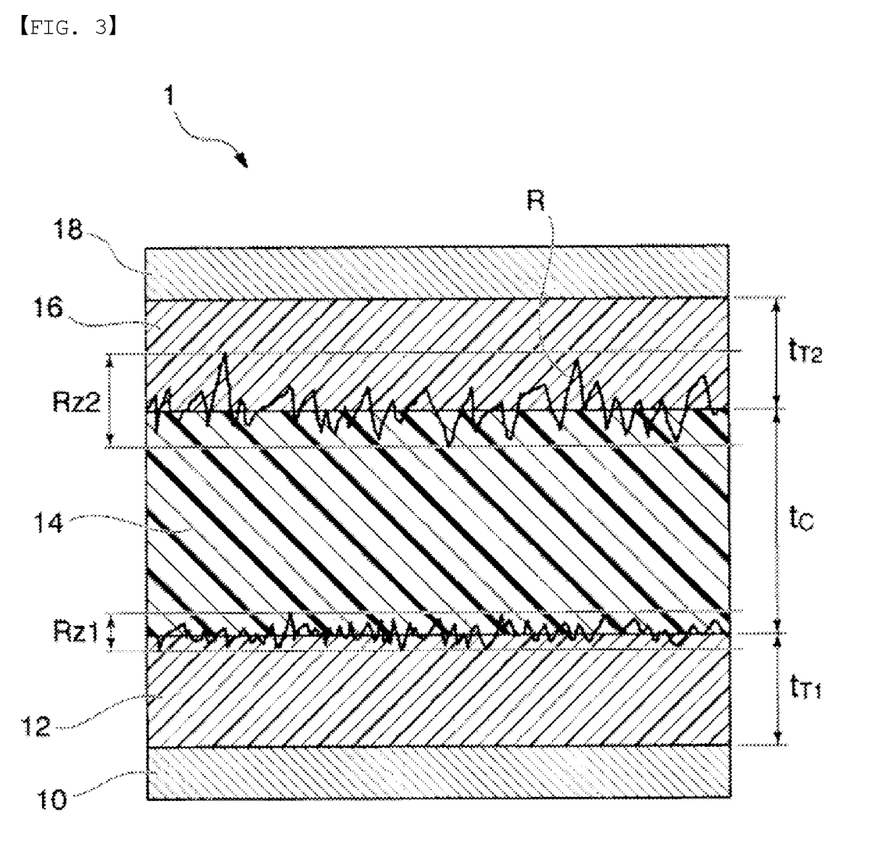
FIG. 3 is a schematic sectional diagram illustrating one example of a metal clad laminate according to an example.

A cross section of each of the copper clad laminates obtained in the examples and the comparative examples was observed using a scanning electron microscope (SEM), and for each of the copper clad laminates, a thickness $t_{T1}$ of the first adhesive layer of the polyimide film, a thickness $t_C$ of the matrix layer, a thickness $t_{T2}$ of the second adhesive layer, interface roughness Rz1 between the first adhesive layer and the matrix layer, and interface roughness Rz2 between the second adhesive layer and the matrix layer were measured. Herein, as illustrated in FIG. 3, interface roughness Rz1 and interface roughness Rz2 were calculated in accordance with 'maximum height roughness Rz' defined in JIS B 0601, and were defined as a sum of the maximum peak height and the maximum bend depth of the roughness curve R of the two-layer interface (that is, difference in heights between the highest part and the deepest part).

(Evaluation 2: Adhesion)

In accordance with JIS C 6481, peel strength when peeling off one side copper foil of each of the copper clad laminates obtained in the examples and the comparative examples from the corresponding copper clad laminate was measured for both sides using a tensile tester.

(Evaluation 3: Dewaterability, Dimensional Stability)

For each of the copper clad laminates obtained in the examples and the comparative examples, the dimension was measured before and after etching the copper foil to examine dimensional stability. Specifically, a marker for assignment was marked on the four corners of the copper clad laminate, and using a microscope IM7000 manufactured by KEYENCE Corporation, a longitudinal length and a horizontal length between the markers of the copper clad laminate were measured. Next, the copper foil was etched, and while measuring a longitudinal length and a horizontal length between the markers after that, time taken for the lengths to become the same lengths measured before the etching treatment was measured. Time required for such dimension stability generally corresponds to a dehydration time of the washing water after the etching treatment.

(Evaluation 4: Solder Heat Resistance)

Each of the copper clad laminates obtained in the examples and the comparative examples was soldered at approximately 340° C. to examine whether each of the laminates had heat resistance (o) or not (X) enough to prevent damages making the copper clad laminate unusable.

Results of Evaluations 1 to 4 performed on each of the copper clad laminates are shown in the following tables. Herein, in the adhesion column, peel strength of the first adhesive layer was described on the left side, and peel strength of the second adhesive layer was described on the right side. In the copper clad laminates D1-1 to 20-2 prepared using the cast method, the film was formed by coating in the order of the first adhesive layer having thickness $t_{T1}$→the matrix layer the second adhesive layer having thickness $t_{T2}$.

TABLE 8

| Copper Clad Laminate | Total Thickness (μm) | Evaluation 1 | | | | | Evaluation 2 Adhesiveness (kg/cm) | | Evaluation 3 Dewaterability (Time) | Evaluation 4 Solder Heat Resistance |
|---|---|---|---|---|---|---|---|---|---|---|
| | | $t_{T1}$ (μm) | Rz1 (μm) | $t_C$ (μm) | Rz2 (μm) | $t_{T2}$ (μm) | | | | |
| C1-1 | 20 | 3.5 | 0.7 | 13 | 0.7 | 3.5 | 10 | 10 | 1 | o |
| C2-1 | 20 | 3.5 | 0.8 | 13 | 0.8 | 3.5 | 10 | 10 | 1 | o |
| C3-1 | 20 | 3.5 | 0.7 | 13 | 0.8 | 3.5 | 10 | 10 | 1 | o |
| C4-1 | 20 | 3.5 | 0.7 | 13 | 0.7 | 3.5 | 10 | 10 | 1 | o |
| C5-1 | 20 | 3.5 | 0.7 | 13 | 0.8 | 3.5 | 10 | 10 | 1 | o |
| C6-1 | 20 | 3.5 | 0.7 | 13 | 0.7 | 3.5 | 10 | 10 | 1 | o |
| C7-1 | 20 | 3.5 | 0.7 | 13 | 0.9 | 3.5 | 10 | 10 | 1 | o |
| C8-1 | 20 | 3.5 | 0.7 | 13 | 0.7 | 3.5 | 10 | 10 | 1 | o |
| C9-1 | 20 | 3.5 | 0.7 | 13 | 0.8 | 3.5 | 10 | 10 | 1 | o |
| C10-1 | 20 | 3.5 | 0.7 | 13 | 0.9 | 3.5 | 10 | 10 | 1 | o |

TABLE 8-continued

| Copper Clad Laminate | Total Thickness (μm) | Evaluation 1 | | | | | Evaluation 2 Adhesiveness (kg/cm) | | Evaluation 3 Dewaterability (Time) | Evaluation 4 Solder Heat Resistance |
|---|---|---|---|---|---|---|---|---|---|---|
| | | $t_{T1}$ (μm) | Rz1 (μm) | $t_C$ (μm) | Rz2 (μm) | $t_{T2}$ (μm) | | | | |
| C11-1 | 20 | 3.5 | 0.8 | 13 | 0.9 | 3.5 | 10 | 10 | 1 | ○ |
| C12-1 | 20 | 3.5 | 0.7 | 13 | 1.0 | 3.5 | 10 | 10 | 1 | ○ |
| C13-1 | 20 | 3.5 | 0.7 | 13 | 0.7 | 3.5 | 10 | 10 | 1 | ○ |
| C14-1 | 20 | 3.5 | 0.7 | 13 | 0.7 | 3.5 | 10 | 10 | 1 | ○ |
| C15-1 | 20 | 3.5 | 0.7 | 13 | 0.8 | 3.5 | 10 | 10 | 1 | ○ |
| C16-1 | 20 | 3.5 | 0.7 | 13 | 0.7 | 3.5 | 10 | 10 | 1 | ○ |
| C17-1 | 20 | 3.5 | 0.7 | 13 | 0.7 | 3.5 | 10 | 10 | 1 | ○ |
| C18-1 | 20 | 3.5 | 0.7 | 13 | 1.0 | 3.5 | 10 | 10 | 1 | ○ |
| C19-1 | 20 | 3.5 | 0.7 | 13 | 0.8 | 3.5 | 10 | 10 | 1 | ○ |
| C20-1 | 20 | 3.5 | 0.7 | 13 | 0.9 | 3.5 | 10 | 10 | 1 | ○ |

TABLE 9

| Copper Clad Laminate | Total Thickness (μm) | Evaluation 1 | | | | | Evaluation 2 Adhesiveness (kg/cm) | | Evaluation 3 Dewaterability (Time) | Evaluation 4 Solder Heat Resistance |
|---|---|---|---|---|---|---|---|---|---|---|
| | | $t_{T1}$ (μm) | Rz1 (μm) | $t_C$ (μm) | Rz2 (μm) | $t_{T2}$ (μm) | | | | |
| C1-2 | 15 | 2.5 | 0.5 | 10 | 0.5 | 2.5 | 10 | 10 | 1 | ○ |
| C2-2 | 15 | 2.5 | 0.5 | 10 | 0.6 | 2.5 | 10 | 10 | 1 | ○ |
| C3-2 | 15 | 2.5 | 0.5 | 10 | 0.5 | 2.5 | 10 | 10 | 1 | ○ |
| C4-2 | 15 | 2.5 | 0.5 | 10 | 0.6 | 2.5 | 10 | 10 | 1 | ○ |
| C5-2 | 15 | 2.5 | 0.5 | 10 | 0.5 | 2.5 | 10 | 10 | 1 | ○ |
| C6-2 | 15 | 2.5 | 0.5 | 10 | 0.6 | 2.5 | 10 | 10 | 1 | ○ |
| C7-2 | 15 | 2.5 | 0.5 | 10 | 0.5 | 2.5 | 10 | 10 | 1 | ○ |
| C8-2 | 15 | 2.5 | 0.5 | 10 | 0.6 | 2.5 | 10 | 10 | 1 | ○ |
| C9-2 | 15 | 2.5 | 0.5 | 10 | 0.5 | 2.5 | 10 | 10 | 1 | ○ |
| C10-2 | 15 | 2.5 | 0.5 | 10 | 0.6 | 2.5 | 10 | 10 | 1 | ○ |
| C11-2 | 15 | 2.5 | 0.5 | 10 | 0.5 | 2.5 | 10 | 10 | 1 | ○ |
| C12-2 | 15 | 2.5 | 0.5 | 10 | 0.6 | 2.5 | 10 | 10 | 1 | ○ |
| C13-2 | 15 | 2.5 | 0.5 | 10 | 0.7 | 2.5 | 10 | 10 | 1 | ○ |
| C14-2 | 15 | 2.5 | 0.5 | 10 | 0.5 | 2.5 | 10 | 10 | 1 | ○ |
| C15-2 | 15 | 2.5 | 0.5 | 10 | 0.6 | 2.5 | 10 | 10 | 1 | ○ |
| C16-2 | 15 | 2.5 | 0.5 | 10 | 0.5 | 2.5 | 10 | 10 | 1 | ○ |
| C17-2 | 15 | 2.5 | 0.5 | 10 | 0.6 | 2.5 | 10 | 10 | 1 | ○ |
| C18-2 | 15 | 2.5 | 0.5 | 10 | 0.5 | 2.5 | 10 | 10 | 1 | ○ |
| C19-2 | 15 | 2.5 | 0.5 | 10 | 0.7 | 2.5 | 10 | 10 | 1 | ○ |
| C20-2 | 15 | 2.5 | 0.5 | 10 | 0.5 | 2.5 | 10 | 10 | 1 | ○ |

TABLE 10

| Copper Clad Laminate | Total Thickness (μm) | Evaluation 1 | | | | | Evaluation 2 Adhesiveness (kg/cm) | | Evaluation 3 Dewaterability (Time) | Evaluation 4 Solder Heat Resistance |
|---|---|---|---|---|---|---|---|---|---|---|
| | | $t_{T1}$ (μm) | Rz1 (μm) | $t_C$ (μm) | Rz2 (μm) | $t_{T2}$ (μm) | | | | |
| D1-1 | 20 | 3.5 | 1.2 | 13 | 0.5 | 3.5 | 8 | 10 | 1 | ○ |
| D2-1 | 20 | 3.5 | 1.5 | 13 | 0.5 | 3.5 | 8 | 10 | 1 | ○ |
| D3-1 | 20 | 3.5 | 1.4 | 13 | 0.5 | 3.5 | 8 | 10 | 1 | ○ |
| D4-1 | 20 | 3.5 | 1.6 | 13 | 0.5 | 3.5 | 8 | 10 | 1 | ○ |
| D5-1 | 20 | 3.5 | 1.5 | 13 | 0.5 | 3.5 | 8 | 10 | 1 | ○ |
| D6-1 | 20 | 3.5 | 1.7 | 13 | 0.5 | 3.5 | 8 | 10 | 1 | ○ |
| D7-1 | 20 | 3.5 | 1.5 | 13 | 0.5 | 3.5 | 8 | 10 | 1 | ○ |
| D8-1 | 20 | 3.5 | 1.7 | 13 | 0.5 | 3.5 | 8 | 10 | 1 | ○ |
| D9-1 | 20 | 3.5 | 1.8 | 13 | 0.5 | 3.5 | 8 | 10 | 1 | ○ |
| D10-1 | 20 | 3.5 | 1.6 | 13 | 0.5 | 3.5 | 8 | 10 | 1 | ○ |
| D11-1 | 20 | 3.5 | 1.6 | 13 | 0.5 | 3.5 | 8 | 10 | 1 | ○ |
| D12-1 | 20 | 3.5 | 1.8 | 13 | 0.5 | 3.5 | 8 | 10 | 1 | ○ |
| D13-1 | 20 | 3.5 | 1.7 | 13 | 0.5 | 3.5 | 8 | 10 | 1 | ○ |
| D14-1 | 20 | 3.5 | 1.9 | 13 | 0.5 | 3.5 | 8 | 10 | 1 | ○ |
| D15-1 | 20 | 3.5 | 1.7 | 13 | 0.5 | 3.5 | 8 | 10 | 1 | ○ |
| D16-1 | 20 | 3.5 | 1.9 | 13 | 0.5 | 3.5 | 8 | 10 | 1 | ○ |

TABLE 10-continued

| Copper Clad Laminate | Total Thickness (μm) | Evaluation 1 $t_{T1}$ (μm) | Rz1 (μm) | $t_C$ (μm) | Rz2 (μm) | $t_{T2}$ (μm) | Evaluation 2 Adhesiveness (kg/cm) | Evaluation 3 Dewaterability (Time) | Evaluation 4 Solder Heat Resistance |
|---|---|---|---|---|---|---|---|---|---|
| D17-1 | 20 | 3.5 | 1.8 | 13 | 0.5 | 3.5 | 8 | 10 | 1 | ○ |
| D18-1 | 20 | 3.5 | 1.7 | 13 | 0.5 | 3.5 | 8 | 10 | 1 | ○ |
| D19-1 | 20 | 3.5 | 1.8 | 13 | 0.5 | 3.5 | 8 | 10 | 1 | ○ |
| D20-1 | 20 | 3.5 | 1.9 | 13 | 0.5 | 3.5 | 8 | 10 | 1 | ○ |

TABLE 11

| Copper Clad Laminate | Total Thickness (μm) | Evaluation 1 $t_{T1}$ (μm) | Rz1 (μm) | $t_C$ (μm) | Rz2 (μm) | $t_{T2}$ (μm) | Evaluation 2 Adhesiveness (kg/cm) | Evaluation 3 Dewaterability (Time) | Evaluation 4 Solder Heat Resistance |
|---|---|---|---|---|---|---|---|---|---|
| D1-2 | 15 | 2.5 | 1.1 | 10 | 0.5 | 2.5 | 5 | 10 | 1 | x |
| D2-2 | 15 | 2.5 | 1.2 | 10 | 0.5 | 2.5 | 5 | 10 | 1 | x |
| D3-2 | 15 | 2.5 | 1.1 | 10 | 0.5 | 2.5 | 5 | 10 | 1 | x |
| D4-2 | 15 | 2.5 | 1.1 | 10 | 0.5 | 2.5 | 5 | 10 | 1 | x |
| D5-2 | 15 | 2.5 | 1.2 | 10 | 0.5 | 2.5 | 5 | 10 | 1 | x |
| D6-2 | 15 | 2.5 | 1.2 | 10 | 0.5 | 2.5 | 5 | 10 | 1 | x |
| D7-2 | 15 | 2.5 | 1.1 | 10 | 0.5 | 2.5 | 5 | 10 | 1 | x |
| D8-2 | 15 | 2.5 | 1.1 | 10 | 0.5 | 2.5 | 5 | 10 | 1 | x |
| D9-2 | 15 | 2.5 | 1.1 | 10 | 0.5 | 2.5 | 5 | 10 | 1 | x |
| D10-2 | 15 | 2.5 | 1.3 | 10 | 0.5 | 2.5 | 5 | 10 | 1 | x |
| D11-2 | 15 | 2.5 | 1.1 | 10 | 0.5 | 2.5 | 5 | 10 | 1 | x |
| D12-2 | 15 | 2.5 | 1.2 | 10 | 0.5 | 2.5 | 5 | 10 | 1 | x |
| D13-2 | 15 | 2.5 | 1.1 | 10 | 0.5 | 2.5 | 5 | 10 | 1 | x |
| D14-2 | 15 | 2.5 | 1.4 | 10 | 0.5 | 2.5 | 5 | 10 | 1 | x |
| D15-2 | 15 | 2.5 | 1.1 | 10 | 0.5 | 2.5 | 5 | 10 | 1 | x |
| D16-2 | 15 | 2.5 | 1.2 | 10 | 0.5 | 2.5 | 5 | 10 | 1 | x |
| D17-2 | 15 | 2.5 | 1.4 | 10 | 0.5 | 2.5 | 5 | 10 | 1 | x |
| D18-2 | 15 | 2.5 | 1.1 | 10 | 0.5 | 2.5 | 5 | 10 | 1 | x |
| D19-2 | 15 | 2.5 | 1.2 | 10 | 0.5 | 2.5 | 5 | 10 | 1 | x |
| D20-2 | 15 | 2.5 | 1.1 | 10 | 0.5 | 2.5 | 5 | 10 | 1 | x |

TABLE 12

| Copper Clad Laminate | Total Thickness (μm) | Evaluation 1 $t_{T1}$ (μm) | Rz1 (μm) | $t_C$ (μm) | Rz2 (μm) | $t_{T2}$ (μm) | Evaluation 2 Adhesiveness (kg/cm) | Evaluation 3 Dewaterability (Time) | Evaluation 4 Solder Heat Resistance |
|---|---|---|---|---|---|---|---|---|---|
| D21-1 | 20 | 3.5 | 0.6 | 13 | 0.7 | 3.5 | 10 | 10 | 10 | ○ |
| D22-1 | 20 | 3.5 | 0.6 | 13 | 0.8 | 3.5 | 10 | 10 | 10 | ○ |
| D23-1 | 20 | 3.5 | 0.7 | 13 | 0.9 | 3.5 | 10 | 10 | 10 | x |
| D24-1 | 20 | 3.5 | 0.7 | 13 | 0.8 | 3.5 | 10 | 10 | 10 | x |
| D25-1 | 20 | 3.5 | 0.6 | 13 | 0.8 | 3.5 | 10 | 10 | 10 | x |
| D26-1 | 20 | 3.5 | 0.8 | 13 | 1.0 | 3.5 | 10 | 10 | 10 | x |
| D27-1 | 20 | 3.5 | 0.7 | 13 | 0.9 | 3.5 | 10 | 10 | 10 | x |
| D28-1 | 20 | 3.5 | 0.8 | 13 | 0.9 | 3.5 | 10 | 10 | 10 | x |
| D29-1 | 20 | 3.5 | 0.8 | 13 | 1.0 | 3.5 | 10 | 10 | 10 | x |
| D30-1 | 20 | 3.5 | 0.6 | 13 | 0.8 | 3.5 | 10 | 10 | 10 | x |
| D31-1 | 20 | 3.5 | 0.6 | 13 | 0.7 | 3.5 | 10 | 10 | 10 | x |
| D32-1 | 20 | 3.5 | 0.7 | 13 | 0.8 | 3.5 | 10 | 10 | 10 | x |
| D33-1 | 20 | 3.5 | 0.6 | 13 | 0.8 | 3.5 | 10 | 10 | 10 | x |
| D34-1 | 20 | 3.5 | 0.7 | 13 | 0.9 | 3.5 | 10 | 10 | 10 | x |
| D35-1 | 20 | 3.5 | 0.7 | 13 | 0.9 | 3.5 | 10 | 10 | 10 | x |
| D36-1 | 20 | 3.5 | 0.6 | 13 | 0.7 | 3.5 | 10 | 10 | 10 | x |
| D37-1 | 20 | 3.5 | 0.7 | 13 | 0.8 | 3.5 | 10 | 10 | 10 | x |
| D38-1 | 20 | 3.5 | 0.8 | 13 | 0.9 | 3.5 | 10 | 10 | 10 | x |
| D39-1 | 20 | 3.5 | 0.5 | 13 | 0.8 | 3.5 | 10 | 10 | 10 | x |
| D40-1 | 20 | 3.5 | 0.6 | 13 | 1.0 | 3.5 | 10 | 10 | 10 | x |

TABLE 13

| Copper Clad Laminate | Total Thickness (μm) | Evaluation 1 | | | | | Evaluation 2 Adhesiveness (kg/cm) | Evaluation 3 Dewaterability (Time) | Evaluation 4 Solder Heat Resistance |
|---|---|---|---|---|---|---|---|---|---|
| | | $t_{T1}$ (μm) | Rz1 (μm) | $t_C$ (μm) | Rz2 (μm) | $t_{T2}$ (μm) | | | |
| D21-2 | 15 | 2.5 | 0.5 | 10 | 0.5 | 2.5 | 10 | 10 | 10 | o |
| D22-2 | 15 | 2.5 | 0.6 | 10 | 0.7 | 2.5 | 10 | 10 | 10 | o |
| D23-2 | 15 | 2.5 | 0.5 | 10 | 0.6 | 2.5 | 10 | 10 | 10 | x |
| D24-2 | 15 | 2.5 | 0.5 | 10 | 0.5 | 2.5 | 10 | 10 | 10 | x |
| D25-2 | 15 | 2.5 | 0.5 | 10 | 0.6 | 2.5 | 10 | 10 | 10 | x |
| D26-2 | 15 | 2.5 | 0.5 | 10 | 0.6 | 2.5 | 10 | 10 | 10 | x |
| D27-2 | 15 | 2.5 | 0.5 | 10 | 0.6 | 2.5 | 10 | 10 | 10 | x |
| D28-2 | 15 | 2.5 | 0.6 | 10 | 0.7 | 2.5 | 10 | 10 | 10 | x |
| D29-2 | 15 | 2.5 | 0.5 | 10 | 0.6 | 2.5 | 10 | 10 | 10 | x |
| D30-2 | 15 | 2.5 | 0.5 | 10 | 0.6 | 2.5 | 10 | 10 | 10 | x |
| D31-2 | 15 | 2.5 | 0.5 | 10 | 0.6 | 2.5 | 10 | 10 | 10 | x |
| D32-2 | 15 | 2.5 | 0.5 | 10 | 0.5 | 2.5 | 10 | 10 | 10 | x |
| D33-2 | 15 | 2.5 | 0.5 | 10 | 0.5 | 2.5 | 10 | 10 | 10 | x |
| D34-2 | 15 | 2.5 | 0.6 | 10 | 0.7 | 2.5 | 10 | 10 | 10 | x |
| D35-2 | 15 | 2.5 | 0.5 | 10 | 0.5 | 2.5 | 10 | 10 | 10 | x |
| D36-2 | 15 | 2.5 | 0.5 | 10 | 0.5 | 2.5 | 10 | 10 | 10 | x |
| D37-2 | 15 | 2.5 | 0.5 | 10 | 0.6 | 2.5 | 10 | 10 | 10 | x |
| D38-2 | 15 | 2.5 | 0.5 | 10 | 0.5 | 2.5 | 10 | 10 | 10 | x |
| D39-2 | 15 | 2.5 | 0.5 | 10 | 0.6 | 2.5 | 10 | 10 | 10 | x |
| D40-2 | 15 | 2.5 | 0.6 | 10 | 0.7 | 2.5 | 10 | 10 | 10 | x |

When examining interface roughness Rz1 and interface roughness Rz2, interface roughness Rz1 and interface roughness Rz2 of the matrix layer and the adhesive layer were all 1.0 μm or less in Examples 1-1 to 20-2 and Comparative Examples 21-1 to 40-2 preparing the copper clad laminate using the laminate method. Meanwhile, in Comparative Examples 1-1 to 20-2 preparing the copper clad laminate using the cast method, one of interface roughness Rz1 and interface roughness Rz2 of the matrix layer and the adhesive layer was 1.0 μm or less, however, the other side roughness was greater than 1.0 μm. In other words, the copper clad laminate prepared using the laminate method had interface roughness suppressed on both sides of the matrix layer compared to the copper clad laminate prepared using the cast method. It is considered that, compared to the laminate method preparing the three-layer-structured laminate film at once, the cast method coating in the order of the first adhesive layer→the matrix layer→the second adhesive layer had asymmetric interface roughness on both sides of the matrix layer while having increased two layer mixing at the layer interface. In other words, a copper clad laminate having high structural symmetry including interface roughness as well as layer thickness was obtained in the laminate method compared to the cast method.

When examining adhesion, peel strength of the copper foil on both surfaces of the copper clad laminate was all 10 kg/cm in Examples 1-1 to 20-2 and Comparative Examples 21-1 to 40-2 preparing the copper clad laminate using the laminate method. Meanwhile, in Comparative Examples 1-1 to 20-2 preparing the copper clad laminate using the cast method, peel strength on the first adhesive layer side was 8 kg/cm, which was smaller than the value of the copper clad laminate prepared using the laminate method. In addition, peel strength on the second adhesive layer side was also 10 kg/cm in Comparative Examples 1-1 to 20-2. In other words, the copper clad laminate prepared using the laminate method was excellent in adhesion of the copper foil compared to the copper clad laminate prepared using the cast method.

When examining dewaterability, time taken for the dimension of the copper clad laminate after etching to go back to the dimension before the etching was 1 hour in Examples 1-1 to 20-2 and Comparative Examples 1-1 to 20-2 forming the matrix layer using the polyamic acid solution A1. Meanwhile, time taken for the dimension of the copper clad laminate after etching to go back to the dimension before the etching was 10 hours in Comparative Examples 21-1 to 40-2 forming the matrix layer using the polyamic acid solution A2. In other words, the copper clad laminate including the matrix layer formed with the polyamic acid solution A1 had significantly superior dimensional stability and dewaterability compared to the copper clad laminate including the matrix layer formed with the polyamic acid solution A2.

When examining heat resistance at a soldering temperature, the copper clad laminates C1-1 to C20-2 in Examples 1-1 to 20-2 all had excellent heat resistance. Meanwhile, among Comparative Examples 1-1 to 20-2, Comparative Examples 1-1, 2-1, . . . , 20-1 having a polyimide film thickness of 20 μm all had excellent heat resistance, whereas Comparative Examples 1-2, 2-2, . . . , 20-2 having a polyimide film thickness of 15 μm were damaged at a soldering temperature. In addition, in Comparative Examples 21-1 to 40-2, the copper clad laminates were all damaged at a soldering temperature regardless of the polyimide film thickness except for Comparative Example 21-1, Comparative Example 21-2, Comparative Example 22-1 and Comparative Example 22-2 using the polyamic acid B1 or B2 as the polyimide material forming the adhesive layer.

Accordingly, by preparing a polyimide film including the matrix layer formed with the polyamic acid solution A1 using PMDA and m-tolidine as raw materials using the laminate method, a polyimide film and a metal clad laminate having excellent adhesion, dimensional stability and heat resistance, and having little mixing between two layers at the layer interface were able to be prepared. In addition, the copper clad laminate prepared using the laminate method had higher structural symmetry compared to the copper clad laminate prepared using the cast method.

In the copper clad laminate prepared using the laminate method, bending of the laminate caused by an asymmetric structure on both sides of the laminate may be suppressed due to high structural symmetry compared to the copper clad laminate prepared using the cast method, and therefore, structural stability of the laminate may be enhanced. In addition, the copper clad laminate prepared using the laminate method had smaller interface roughness on both sides of the matrix layer compared to the copper clad laminate prepared using the cast method, and therefore, uniformity in the film is favorable, and handling is simple. In addition, the laminate method is capable of drying the whole laminate at once, and is thereby more efficient than the cast method repeating coating and drying for each layer.

Hereinbefore, the present disclosure has been described with reference to limited examples and drawings, however, the present disclosure is not limited thereto, and various modifications and changes may be made within a range of equivalents of technological ideas and the scope of claims by those skilled in the art.

The invention claimed is:

1. A film comprising:
a matrix layer formed with a polyimide obtained from pyromellitic dianhydride and m-tolidine;
a first adhesive layer formed on one surface of the matrix layer formed with first thermoplastic polyimide; and
a second adhesive layer formed on the other surface of the matrix layer formed with second thermoplastic polyimide,
wherein the first and second thermoplastic polyimide comprises a tetracarboxylic acid component and a diamine component, and wherein the tetracarboxylic acid component comprises 3,3',4,4'-diphenylsulfonetetracarboxylic dianhydride (DSDA) wherein the diamine component is chosen from the group consisting of 1,3-bis(4-aminophenoxy)benzene (TPE-R) and 1,4-bis (4-aminophenoxy)benzene (APD),
wherein a maximum height roughness of a first interface between the matrix layer and the first adhesive layer and a maximum height roughness of a second interface between the matrix layer and the second adhesive layer are 1.0 μm or less, wherein the maximum height roughness is measured according to JIS B 0601.

2. The film of claim 1, wherein the first thermoplastic polyimide and the second thermoplastic polyimide are the same polyimide.

3. The film of claim 1, wherein the first adhesive layer and the second adhesive layer have approximately the same thickness.

4. A metal clad laminate comprising:
the film of claim 1; and
a metal clad layer formed on at least one surface of the film.

5. The metal clad laminate of claim 4, wherein the metal clad layer is formed on both surfaces of the film; and a peel strength to peel off the metal clad layer from the film is 10 kg/cm or greater on both surfaces of the film.

6. A flexible substrate comprising:
the film of claim 1; and
a conductive pattern formed on at least one surface of the film.

7. A method for preparing a film of claim 1 using a thermal imidization method, the method comprising:
preparing a first precursor including a first polyamic acid obtained from pyromellitic dianhydride and m-tolidine;
preparing a second precursor including a second polyamic acid and a third precursor including a third polyamic acid;
forming a laminate body having the first precursor sandwiched between the second precursor and the third precursor by simultaneously extrusion molding the first precursor, the second precursor and the third precursor; and
obtaining a three-layer film by heating the laminate body.

8. The method for preparing a film of claim 7, wherein obtaining the three-layer film includes a process of conducting thermal imidization on the first polyamic acid, the second polyamic acid and the third polyamic acid, by heating the laminate body to produce polyimide for a matrix derived from the first polyamic acid, first thermoplastic polyimide derived from the second polyamic acid, and second thermoplastic polyimide derived from the third polyamic acid.

9. The method for preparing a film of claim 7, wherein the second polyamic acid and the third polyamic acid are the same polyamic acid.

10. The method for preparing a film of claim 7, wherein the second polyamic acid and the third polyamic acid are each polyamic acid obtained from pyromellitic anhydride and 2,2-bis[4-(4-aminophenoxy)phenyl]propane.

11. A method for preparing a metal clad laminate of claim 4 using a thermal imidization method, the method comprising:
preparing a first precursor including a first polyamic acid obtained from pyromellitic dianhydride and m-tolidine;
preparing a second precursor including a second polyamic acid and a third precursor including third polyamic acid;
forming a laminate body having the first precursor sandwiched between the second precursor and the third precursor by simultaneously extrusion molding the first precursor, the second precursor and the third precursor;
obtaining a three-layer film by heating the laminate body; and
laminating a metal clad layer on the three-layer film.

12. The method for preparing a metal clad laminate of claim 11, further comprising:
forming a conductive pattern on at least one surface of the three-layer film by etching the metal clad layer.

* * * * *